United States Patent
Lidman et al.

(10) Patent No.: US 11,366,685 B2
(45) Date of Patent: Jun. 21, 2022

(54) ACCESS FILTER FOR SECURITY SUBSYSTEM

(71) Applicant: Synaptics Incorporated, San Jose, CA (US)

(72) Inventors: Pontus Evert Lidman, Saratoga, CA (US); Jingliang Li, San Jose, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 245 days.

(21) Appl. No.: 16/685,989

(22) Filed: Nov. 15, 2019

(65) Prior Publication Data
US 2021/0149710 A1    May 20, 2021

(51) Int. Cl.
| G06F 13/00 | (2006.01) |
| G06F 9/46 | (2006.01) |
| G06F 9/445 | (2018.01) |
| G06F 9/48 | (2006.01) |
| G06F 9/448 | (2018.01) |
| G06F 9/4401 | (2018.01) |
| G06F 9/54 | (2006.01) |

(52) U.S. Cl.
CPC ............ *G06F 9/468* (2013.01); *G06F 9/4418* (2013.01); *G06F 9/4498* (2018.02); *G06F 9/44505* (2013.01); *G06F 9/467* (2013.01); *G06F 9/485* (2013.01); *G06F 9/546* (2013.01)

(58) Field of Classification Search
CPC ........................................................ G06F 9/468
USPC ........................................................ 711/154
See application file for complete search history.

(56) References Cited

U.S. PATENT DOCUMENTS

| | | | |
|---|---|---|---|
| 2004/0243835 A1* | 12/2004 | Terzis | H04L 63/102 |
| | | | 726/3 |
| 2007/0088874 A1 | 4/2007 | Brabant | |
| 2008/0189560 A1* | 8/2008 | Case | G06F 12/1458 |
| | | | 713/193 |
| 2009/0055637 A1 | 2/2009 | Holm et al. | |
| 2015/0229654 A1 | 8/2015 | Perier | |
| 2018/0032723 A1 | 2/2018 | Danger et al. | |
| 2018/0046378 A1* | 2/2018 | Coburn | G06F 12/1009 |

OTHER PUBLICATIONS

International Search Report and Written Opinion from PCT/US2020/054850, dated Jan. 26, 2021, pp. 1-11.

* cited by examiner

*Primary Examiner* — Timothy A Mudrick
(74) *Attorney, Agent, or Firm* — Paradice & Li LLP

(57) ABSTRACT

A processing system including a processor, a first memory, a state machine configured to transition between a plurality of states, and an access filter. The first memory stores instructions that are executable by the processor, where execution of the instructions causes the processor to initiate transactions with one or more hardware resources. The access filter may filter the transactions initiated by the processor by selectively denying access to the hardware resources based at least in part on a current state of the state machine. The access filter may also filter transactions initiated by one or more of the hardware resources based at least in part on the current state of the state machine.

20 Claims, 10 Drawing Sheets

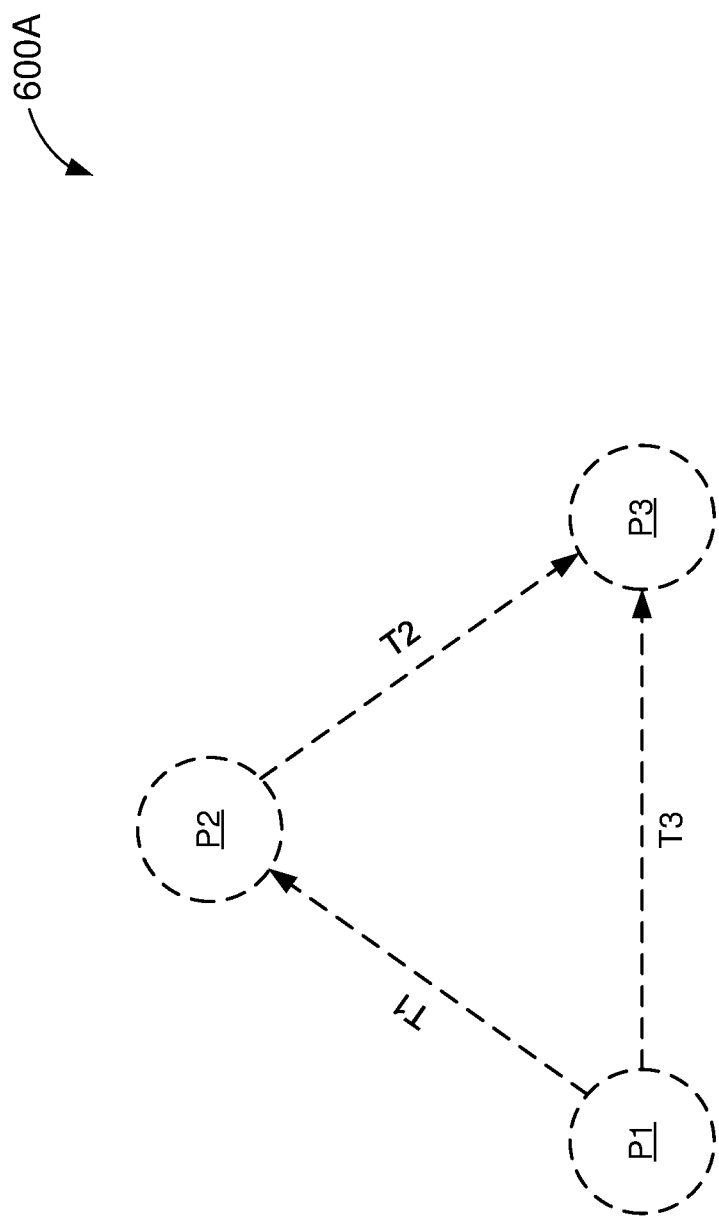

ACCESS FILTER FOR SECURITY SUBSYSTEM

TECHNICAL FIELD

The present embodiments relate generally to secure processing systems and devices.

BACKGROUND OF RELATED ART

Many electronic systems and devices have security subsystems designed to store and execute highly sensitive code and/or data (e.g., firmware, software, cryptographic keys, and the like). An example security subsystem may include read-only memory (ROM), a secure central processing unit (CPU), and one or more cryptographic accelerators. During a system boot operation, the secure CPU may retrieve and execute code stored in the ROM to verify the device hardware and/or load and initialize the operating system (OS). The secure CPU may use the cryptographic accelerators to help decrypt and/or authenticate the firmware or software stored in external memory (such as flash memory, universal serial bus (USB) drives, or other non-volatile storage devices) prior to executing such firmware or software. At the end of the system boot operation, the secure CPU relinquishes control of the electronic system to the OS, which may be executed by a host CPU.

To prevent unauthorized access to the sensitive code and/or data, the security subsystem may be isolated or physically separated from other components of the electronic system (such as a host processor, external memory, input devices, and the like). However, the physical separation alone may not render the security subsystem impervious to attacks from malicious code in the external environment.

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

A method and apparatus for secure processing is disclosed. One innovative aspect of the subject matter of this disclosure can be implemented in a processing system including a processor, a first memory, a state machine configured to transition between a plurality of states, and an access filter. The first memory stores instructions that are executable by the processor, where execution of the instructions causes the processor to initiate transactions with one or more hardware resources. The access filter is configured to filter the transactions by selectively denying access to the hardware resources based at least in part on a current state of the state machine.

BRIEF DESCRIPTION OF THE DRAWINGS

The present embodiments are illustrated by way of example and are not intended to be limited by the figures of the accompanying drawings.

FIG. 6A shows an example state machine, in accordance with some embodiments.

DETAILED DESCRIPTION

Figure 1:
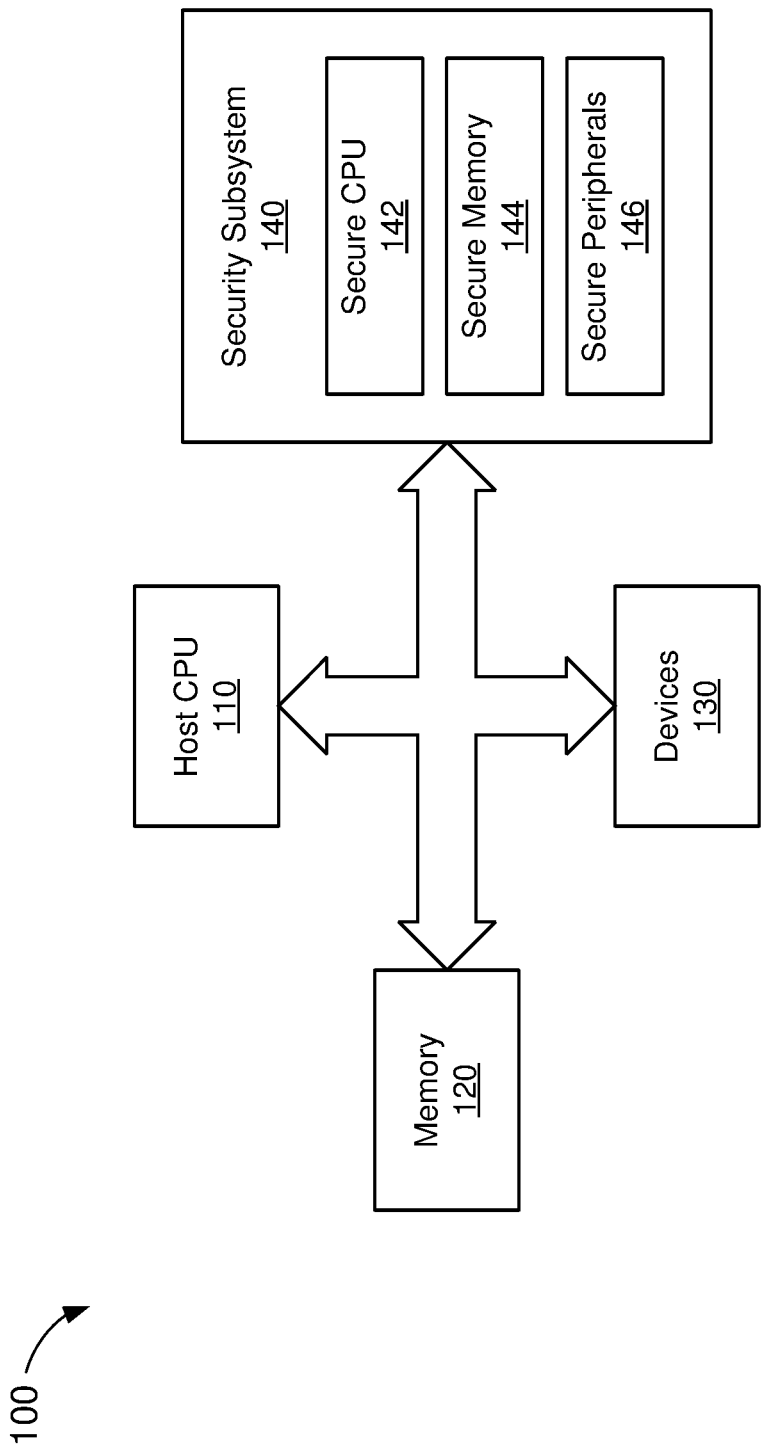
FIG. 1 shows a block diagram of an electronic system, in accordance with some embodiments.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random-access memory (SDRAM), read only memory (ROM), non-volatile random-access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general-purpose processor, conventional processor, controller, microcontroller, and/or state machine capable of executing scripts or instructions of one or more software programs stored in memory.

FIG. 1 shows a block diagram of an electronic system 100, in accordance with some embodiments. Example suitable electronic systems may include, but are not limited to, personal computing devices (e.g., desktop computers, laptop computers, netbook computers, tablets, web browsers, e-book readers, and personal digital assistants (PDAs)), composite input devices (e.g., physical keyboards, joysticks, and key switches), data input devices (e.g., remote controls and mice), data output devices (e.g., display screens and printers), remote terminals, kiosks, video game machines (e.g., video game consoles, portable gaming devices, and the like), communication devices (e.g., cellular phones such as smart phones), and/or media devices (e.g., recorders, editors, and players such as televisions, set-top boxes, music players, digital photo frames, and digital cameras).

The system 100 includes a host central processing unit (CPU) 110, a memory 120, one or more devices 130, and a security subsystem 140. The host CPU 110 may comprise one or more general-purpose processors configured to execute one or more applications and/or operating systems. The memory 120 may store data and/or instructions to be accessed or executed by the host CPU 110. The devices 130 may include any additional hardware resources residing on, or coupled to, the electronic system 100. Example devices may include, but are not limited to, keyboards, mice, joysticks, cameras, capacitive sensors, touch pads, fingerprint sensors, microphones, audio recording devices, displays, modems, and/or wireless radios.

In some implementations, the host CPU 110 may be configurable to operate in a secure state and a non-secure state. For example, the host CPU 110 may operate in the secure state when executing applications and/or processes from a trusted execution environment (TEE) and may operate in the non-secure state when executing applications and/or processes from a rich execution environment (REE). The TEE may be physically and/or virtually partitioned (e.g., walled off) from the REE. One or more of the devices 130 may also be configured to operate in a secure state and/or a non-secure state, depending on the application or instructions being executed. For example, any hardware resources capable of executing or processing instructions on behalf of one or more trusted applications can be configured to operate in the secure state. On the other hand, hardware resources that are not capable of executing or processing instructions on behalf of any trusted applications are configured to operate only in the non-secure state.

In some implementations, the memory 120 may include a secure partition for storing protected data. Examples of protected data may include, but are not limited to, user data (e.g., search inputs, profile information, content selections, biometric inputs, and the like), premium media content (e.g., television shows, movies, music, and the like) or other media content that may be protected under digital rights management (DRM), copyright, or other laws and/or regulations. Due to the secrecy and/or sensitivity of the protected data, the secure memory partition may be inaccessible to software and/or hardware outside of the TEE. Moreover, applications executing from within the TEE may be restricted from communicating the protected data to the REE.

The security subsystem 140 provides an additional layer of security for highly sensitive code and/or data that may be vital to the operation of the electronic system 100. Examples of such code and/or data may include, but are not limited to, firmware, software, cryptographic keys, and the like. In some implementations, the security subsystem 140 may be physically partitioned or otherwise isolated from the remainder of the electronic system 100 such that no hardware resources external to the security subsystem 140 (including the host CPU 110 and/or the devices 130) may have direct access to, or control over, any hardware resources within the security subsystem 140. More specifically, the security subsystem 140 may be configured such that any code and/or data stored therein is accessible only by other hardware resources that are part of, or reside within, the security subsystem 140.

The security subsystem 140 includes a secure CPU 142, a secure memory 144, and one or more secure peripherals 146. The secure CPU 142 may comprise one or more general-purpose processors configured to execute software and/or firmware instructions. The secure memory 144 may store data and instructions (e.g., firmware, software, cryptographic keys, etc.) to be accessed or executed by the secure CPU 142 and/or one or more secure peripherals 146. The secure peripherals 146 may include any device and/or circuitry under the control of the secure CPU 142. For example, the secure CPU 142 may instruct the secure peripherals 146 to perform various tasks. Example secure peripherals 146 may include, but are not limited to, direct memory access (DMA) engines, cryptographic accelerators, key ladders, and input and output (I/O) interfaces.

In some implementations, the security subsystem 140 may provide secure boot and runtime security services for the electronic system 100. For example, during a secure boot operation, the secure CPU 142 may retrieve and execute code (e.g., firmware) stored in the secure memory 144 to verify the hardware resources of the electronic system 100 and load or initialize the operating system (OS). In some aspects, the secure memory 144 may include read-only memory (ROM) and random-access memory (RAM). The system boot code may be initially stored in ROM. Thus, the secure CPU 142 may read the boot code from ROM and load one or more portions of the boot code into RAM. The secure CPU 142 may also load one or more portions of the boot code from external memory (such as flash memory, universal serial bus (USB) drives, or other non-volatile storage devices). In some implementations, the secure CPU 142 may use one or more of the secure peripherals 146 (e.g., cryptographic accelerators) to decrypt and/or authenticate the boot code. Once authenticated, the secure CPU 142 may proceed to execute the boot code to verify the hardware resources of the electronic system 100.

At the end of the boot sequence, the secure CPU 140 may relinquish control of the electronic system to the OS (e.g., executed by the host CPU 110). The secure CPU 142 may then retrieve different firmware and/or other instructions, from ROM or external memory, for providing runtime security services. In some electronic systems, the switching of firmware may be handled by the current firmware executed by the secure CPU 142. For example, the boot code may instruct the secure CPU 142 to load the firmware for runtime security services after completion of the secure boot operation. Aspects of the present disclosure recognize that, by allowing device firmware to handle the switch to other firmware, hardware resources that are accessible to the first firmware may also be accessible to the second firmware. As a result, attacks on the second firmware may compromise the hardware resources of the security subsystem 140, including the first firmware.

In some embodiments, the switching of firmware within the security subsystem 140 may be handled by hardware, independent of any firmware stored in the secure memory 144 and/or executed by the secure CPU 142. Accordingly, if one firmware becomes compromised, the hardware-based security features may still prevent the compromised firmware from accessing other firmware and/or associated data in the security subsystem 140. In this manner, the present embodiments may provide even greater protection for the sensitive code and/or data residing within the security subsystem 140

In some embodiments, a hardware-based personality controller may allow the secure CPU 142 to access only the ROM code associated with runtime security services when implementing a runtime security personality. More specifically, the runtime security personality may restrict the runtime security services firmware from accessing the boot code and/or any residual data from the secure boot operation. Accordingly, if the runtime security services firmware becomes compromised, the compromised firmware is still prevented from accessing the secure boot firmware and associated data. Thus, by using hardware (rather than firmware) to control switches in firmware, the present embodiments may provide even greater security for the highly sensitive code and/or data residing within the security subsystem 140.

Figure 2:
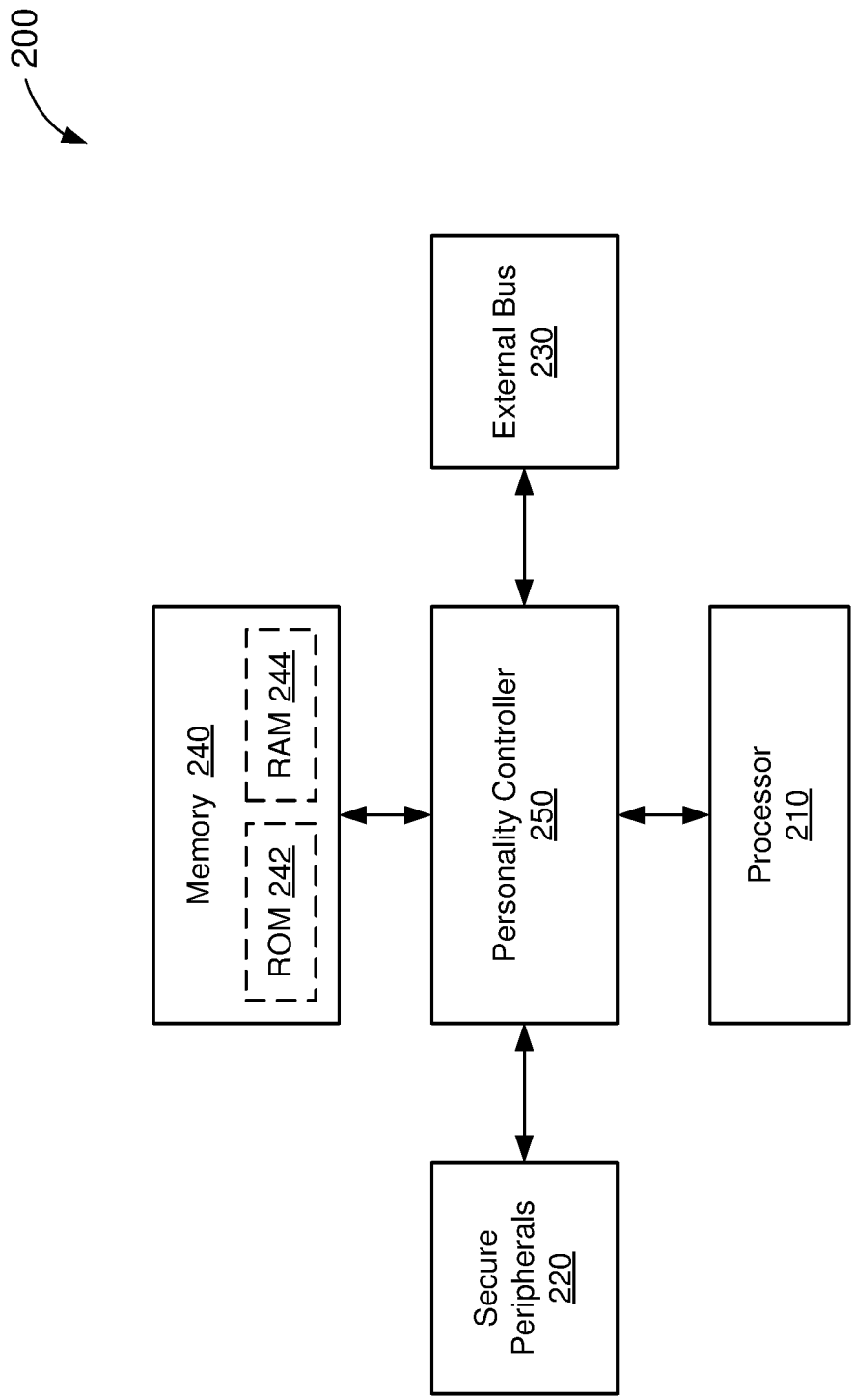
FIG. 2 shows a block diagram of a security subsystem, in accordance with some embodiments.

FIG. 2 shows a block diagram of a security subsystem 200, in accordance with some embodiments. The security subsystem 200 may be one embodiment of the security subsystem 140 of FIG. 1. Thus, the security subsystem 200 may be configured to protect sensitive code and/or data that may be vital to the operation of an electronic system (such as the electronic system 100 of FIG. 1).

The security subsystem 200 includes a processor 210, one or more secure peripherals 220, an external bus 230, a memory 240, and a personality controller 250. The processor 210, secure peripherals 220, and memory 240 may be respective embodiments of the secure processor 142, secure peripherals 146, and secure memory 144 of FIG. 1. For example, the processor 210 may be configured to execute software and/or firmware instructions on behalf of the security subsystem 200, the memory 240 may store data and instructions to be executed by the processor 210 and/or secure peripherals 220, and the secure peripherals 220 may perform various tasks under the control of the processor 210. In the embodiment of FIG. 2, the memory 240 includes ROM 242 and RAM 244. The external bus 230 may provide a communication interface between the security subsystem 200 and one or more external hardware resources, such as the host CPU 110, memory 120, and/or device 130 of FIG. 1.

In some embodiments, the personality controller 250 may selectively filter transactions between the various hardware resources 210-240 based, at least in part, on a "personality" of the security subsystem 200. More specifically, the security subsystem 200 may be configured to operate as a plurality of different personalities. Each personality may define a set of restrictions on hardware access and/or firmware execution. In some aspects, the personality controller 250 may be initialized to a secure boot personality. While configured in the secure boot personality, the personality controller 250 may allow the processor 210 to access only boot code stored in memory 240. For example, the processor 210 may retrieve the boot code from ROM 242 or external memory (not shown for simplicity) and load the boot code into RAM 244. The personality controller 250 may also allow the processor 210 and/or secure peripherals 220 to authenticate or execute the boot code from RAM 244. However, any attempts to access other firmware stored in ROM 242 (such as firmware associated with runtime security services) may be rejected or otherwise prohibited by the personality controller 250.

When the secure boot operation is completed, the processor 210 may request a change of personality by the personality controller 250. The personality controller 250 may accept or reject the request based at least in part on its hardware configuration. In some embodiments, the personality controller 250 may be preconfigured, in hardware, to operate in a limited number of states (e.g., personalities). The transitions between the various states may also be predefined. Accordingly, certain state transitions may be valid while other state transitions maybe invalid. The personality controller 250 may implement the new personality only if the requested change of personality is associated with a valid state transition in hardware. Otherwise, the personality controller 250 will reject the change of personality requested by the processor 210.

For example, the personality controller 250 may support a state transition from the secure boot personality to a runtime security personality. Upon receiving a request to transition to the runtime security personality, the personality controller 250 may clear the boot code from RAM 244, including any associated data that is not necessary for runtime security services. This may prevent the runtime security services firmware from accessing the boot code and/or any residual data from the secure boot operation. The personality controller 250 may further reset the processor 210 and adjust the reset vector to point to the address in ROM 242 where the runtime security services firmware is stored.

The personality controller 250 may then transition from the secure boot personality to the runtime security personality. In some embodiments, this state transition may be a one-way transition. In other words, once the personality controller 250 begins implementing the runtime security personality, it may not transition back to the secure boot personality. The runtime security personality may allow the processor 210 to access and execute only the runtime security services firmware. More specifically, the personality controller 250 may prevent the runtime security services firmware from accessing the boot code and/or any residual data from the secure boot operation. Accordingly, if the runtime security services firmware becomes compromised, the personality controller 250 may prevent the secure boot firmware and associated data from also becoming compromised.

Although the examples herein refer to a secure boot personality and a runtime security personality, the present embodiments may be used to define states and/or personalities with any level of granularity. For example, in some embodiments, individual steps of a secure boot operation may be associated with different personalities. Thus, the personality controller 250 may transition through multiple personalities before completing the secure boot operation.

Figure 3:
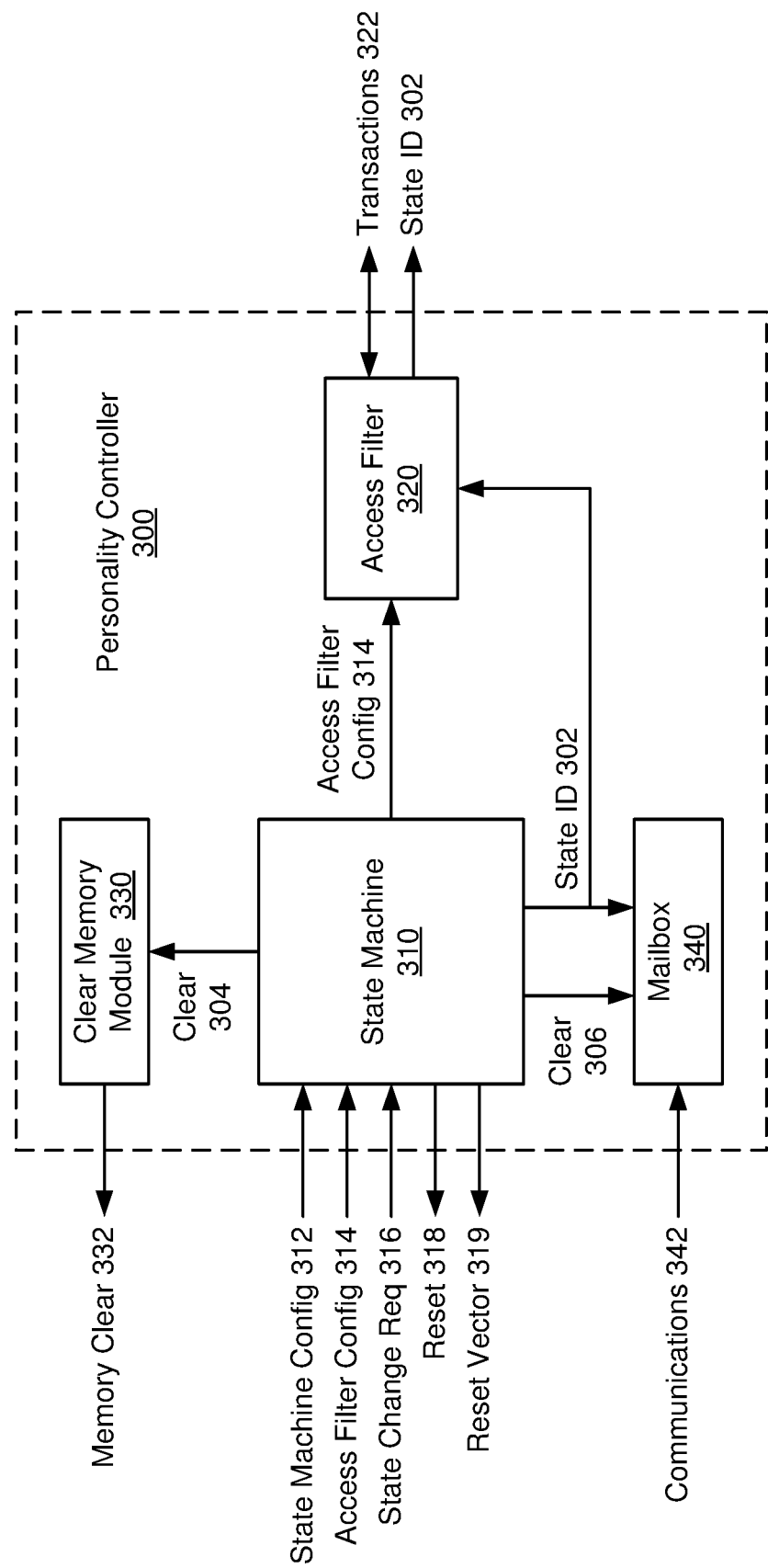
FIG. 3 shows a block diagram of a personality controller, in accordance with some embodiments.

FIG. 3 shows a block diagram of a personality controller 300, in accordance with some embodiments. The personality controller 300 may be one embodiment of the personality controller 250 of FIG. 2. Thus, the personality controller 300 may filter transactions between various hardware resources of a security subsystem (not shown for simplicity). In some embodiments, the personality controller 300 may filter the transactions based, at least in part, on a personality of the security subsystem.

The personality controller 300 includes a state machine 310, an access filter 320, a clear memory module 330, and a mailbox 340. The state machine 310 may be a finite state machine implemented in hardware. For example, the state machine 310 may comprise combinatorial logic coupled to a plurality of flip-flops. The flip-flops may store the various states of the state machine 310 and the combinatorial logic may be used to define the transitions between the various states. In some embodiments, the state machine 310 may be hardcoded to implement a number of predefined states and state transitions. In some other embodiments, the state machine 310 may retrieve state machine configuration data 312 upon initialization of the state machine 310 and/or the personality controller 300. For example, the state machine configuration data 312 may be stored in secure memory (such as the ROM 242 of FIG. 2). The state machine configuration data 312 may define the various states and/or state transitions of the state machine 310.

In some aspects, the state machine 310 may output a state identification (ID) signal 302 associated with its current state. Each state of the state machine 310 may correspond with a different personality for the personality controller 300. As described above, each personality may define a set of restrictions on hardware access and/or firmware execution. Thus, in some aspects, the state machine 310 may retrieve a set of access filter configuration data 314 each time the state machine 310 is initialized and/or transitions to a new state. For example, the access filter configuration data 314 may be stored in secure memory (such as the ROM 242 of FIG. 2). Each set of access filter configuration data 314 may define the hardware access restrictions for a different personality. In some aspects, the state machine 310 may forward the access filter configuration data 314 to the access filter 320, for example, to implement the hardware access restrictions for the current personality.

The access filter 320 may filter transactions 322 between the hardware resources of the security subsystem (such as the processor 210, secure peripherals 220, external bus 230, and memory 240 of FIG. 2) using the access filter configuration data 314 received from the state machine 310. For example, all transactions 322 within the security subsystem may be routed through the access filter 320. Thus, the access filter 320 may operate as an access control agent between the various hardware resources of the security subsystem. In some embodiments, the access filter 320 may selectively allow or deny the transactions 322 based, at least in part, on a current state of the state machine 310. For example, the access filter 320 may receive a different set of access filter configuration data 314 depending on the current state of the state machine 310. In some embodiments, the access filter 320 may filter the transactions 322 based, at least in part, on the information included in each transaction.

Figure 4:
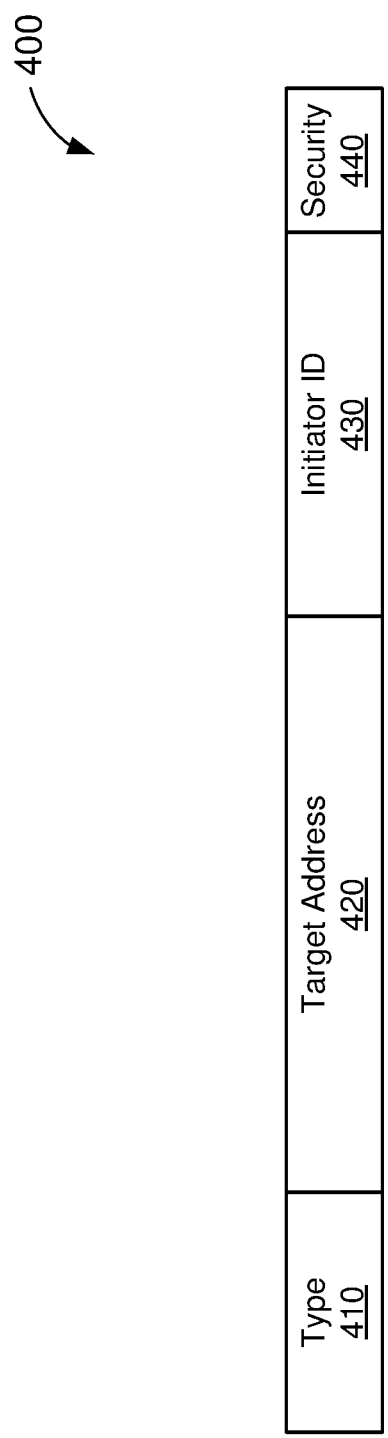
FIG. 4 shows an example hardware access transaction, in accordance with some embodiments.

With reference for example to FIG. 4, a hardware access transaction 400 may include a transaction type 410, a target address 420, an initiator identifier (ID) 430, and security information 440. The hardware access transaction 400 may be one embodiment of the transactions 322 of FIG. 3. The transaction type 410 indicates the type of operation (e.g., read or write) invoked by transaction 400. The target address 420 indicates the physical or virtual location (e.g., memory address) of the target for the intended operation. The initiator ID 430 may be an address or other identifying feature of the hardware resource initiating the transaction 400. The security information 440 indicates the security state of the hardware resource initiating the transaction 400. In some implementations, the security information 440 may comprise a single bit of data indicating whether the hardware resource is in a secure state or a non-secure state when the transaction 400 is initiated.

The access filter configuration data 314 may define a set of rules for filtering each transaction 400 based on the transaction type 410, the target address 420, the initiator ID 430, the security information 440, or any combination thereof. For example, the access filter 320 may generally reject any transactions 400 initiated by an external device (e.g., outside the security subsystem) that targets hardware resources within the security subsystem. The access filter configuration data 314 may also define a more granular set of rules for filtering transactions 400 within the security subsystem. For example, the access filter 320 may reject any transactions 400 attempting to read data from secure memory (such as ROM code) associated with a personality other than the current personality. Thus, the types of operations 410, target addresses 420, initiator IDs 430, and/or security states 440 for which transactions 400 are permitted and/or restricted within the security subsystem may dynamically change in response to changes in the state of the state machine 310.

Referring back to FIG. 3, the state machine 310 may change states responsive to state change requests 316 initiated by a secure processor residing within the security subsystem (such as the secure CPU 142 of FIG. 1 or the processor 210 of FIG. 2). The state machine 310 may implement the state change only if there exists a valid transition to the new state (e.g., as defined by the state machine configuration data 312). If no valid transition exists from the current state to the new state, the state machine 310 may reject the state change request 316. On the other hand, if a valid transition exists from the current state to the new state, the state machine 310 may clear one or more registers within the personality controller 300 and/or the security subsystem before transitioning to the new state.

In some embodiments, the state machine 310 may output clear commands 304 and 306 to clear at least a portion of the data stored in secure memory (such as the RAM 244 of FIG. 2) and/or the mailbox 340, respectively. The clear memory module 330 may clear or erase a portion of the secure memory in response to the clear command 304. For example, the clear memory module 330 may erase or overwrite data stored in the secure memory using a memory clear signal 332. In some embodiments, the clear command 304 may specify a particular range (or ranges) of memory addresses to be cleared. For example, the clear memory module 330 may clear the firmware stored in RAM 244 for the current personality, as well as any associated data that may not be necessary for the next personality associated with the state transition. This may prevent firmware associated with the next personality from accessing or comprising the firmware for the current personality.

The mailbox 340 provides a secure communication interface between hardware resources within the security subsystem and hardware resources that are external to the security subsystem. With reference for example to FIG. 1, the mailbox 340 may facilitate communications 342 between the secure processor 142 and the host CPU 110 or devices 130. For example, the mailbox 340 may comprise a set of registers that can be read and/or written by the secure CPU 142, the host CPU 110, and/or the devices 130. In some aspects, the mailbox 340 may include a first set of registers that can only be written by the secure CPU 142 and read by external devices (such as the host CPU 110 and/or devices 130) and a second set of registers that can only be read by the secure CPU 142 and written by the external devices. In some embodiments, the mailbox 340 may clear or erase one or more of its registers in response to the clear command 306. This may prevent firmware associated with the next personality from accessing secure communications related to the current personality.

Before transitioning to the new state, the state machine 310 may further reset one or more hardware resources of the security subsystem. In some embodiments, the state machine 310 may assert or activate a reset signal 318 which is provided to each of the hardware resources to be reset. The reset signal 318 may be used to reset the internal state of the processor 210 and/or secure peripherals 220, for example, by clearing any internal registers, memory, and the like. In some embodiments, the state machine 310 may further program the processor 210 with a new reset vector 319 while the reset signal 318 is asserted. The reset vector 319 may be specific to the new state of the state machine 310. For example, the reset vector 319 may point to a new memory address (e.g., in the ROM 242) in which the firmware or instructions associated with the new personality is stored. Thus, if the processor 210 is subsequently reset after the state machine 310 has transitioned to the new state, the processor 210 will not be able to re-load the firmware or instructions associated with the previous state.

After clearing the registers and resetting the hardware resources of the security subsystem, the state machine 310 may then perform the transition to the new state. When transitioning to the new state, the state machine 310 may retrieve a new set of access filter configuration data 314 and update the state ID signal 302 to reflect the new state or personality. The new access filter configuration data 314 may be provided to the access filter 320 to implement the hardware access rules or restrictions associated with the new state. Finally, the state machine 310 may de-assert the reset signal 318 to release the processor 210 and/or secure peripherals 220 from the reset state. This allows the processor 210 to begin executing instructions associated with the new state or personality, for example, by loading the firmware from the memory location pointed to by the reset vector 319.

Figure 5:
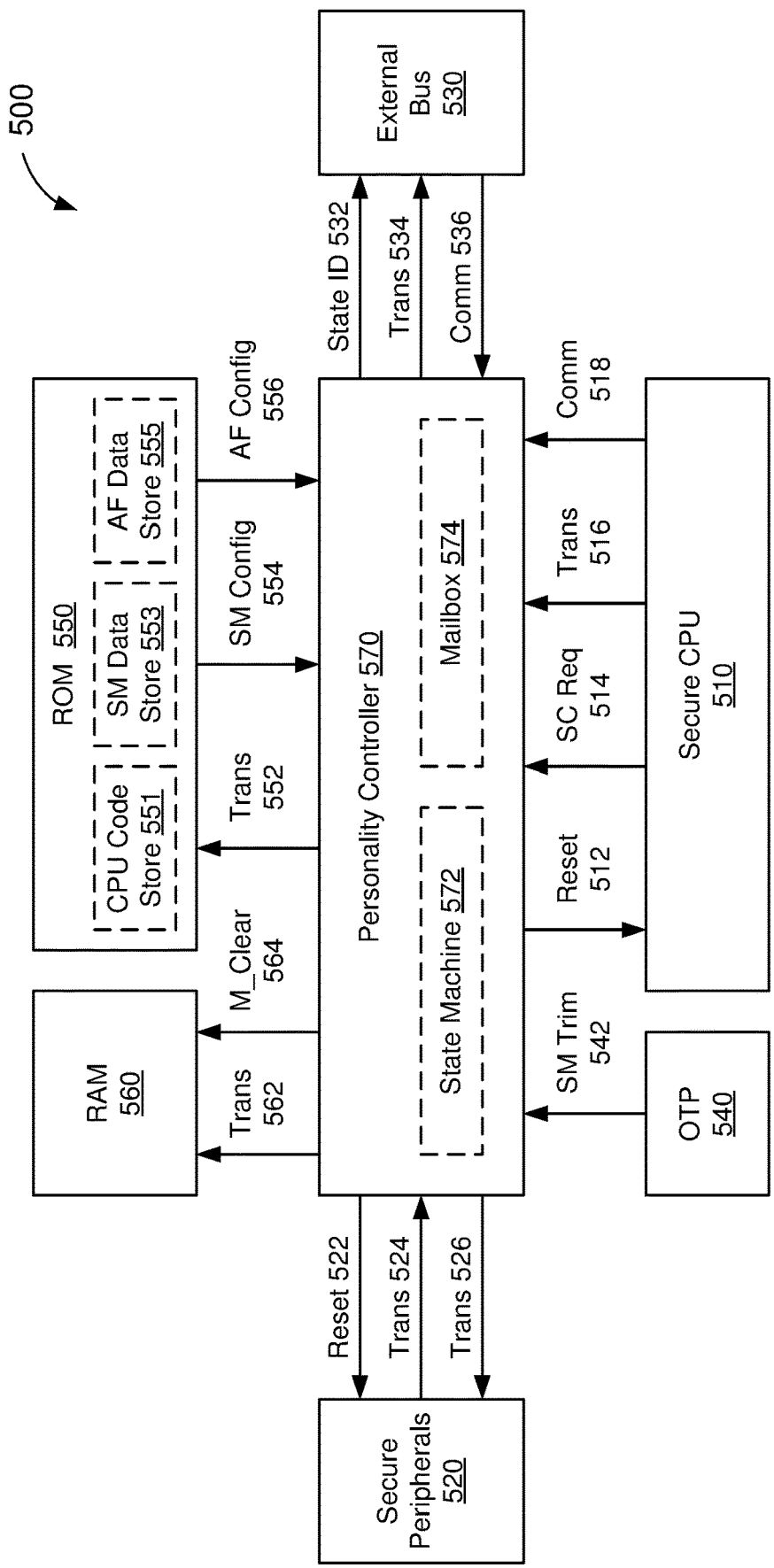
FIG. 5 shows a more detailed block diagram of a security subsystem, in accordance with some embodiments.

FIG. 5 shows a more detailed block diagram of a security subsystem 500, in accordance with some embodiments. The security subsystem 500 may be one embodiment of the security subsystem 140 of FIG. 1 and/or security subsystem 200 of FIG. 2. Thus, the security subsystem 500 may be configured to protect sensitive code and/or data that may be vital to the operation of an electronic system (such as the electronic system 100 of FIG. 1).

The security subsystem 500 includes a secure CPU 510, one or more secure peripherals 520, an external bus 530, a one-time programmable (OTP) memory 540, ROM 550, and RAM 560, and a personality controller 570. The secure CPU 510 may be one embodiment of the secure CPU 142 and/or processor 210. The secure peripherals 520 may be one embodiment of the secure peripherals 146 and/or secure peripherals 220. The external bus 530 may be one embodiment of the external bus 230. The OTP memory 540, ROM 550, and RAM 560 may collectively be an embodiment of the secure memory 144 and/or memory 240. More specifically, the ROM 550 may be one embodiment of the ROM 242 and the RAM 560 may be one embodiment of the RAM 244.

The personality controller 570 may be one embodiment of the personality controller 250 and/or personality controller 300 of FIG. 3. Thus, the personality controller 570 may filter transactions between the hardware resources 510-560 of the security subsystem 500 based, at least in part, on one or more predefined personalities. Each personality may define a set of restrictions on hardware access and/or firmware execution. Further, each personality may be associated with a respective state of a state machine 572. In some embodiments, the personality controller 570 may output a state ID signal 532 to the external bus 530, for example, to indicate the current state or personality to one or more external hardware resources.

The state machine 572 may be implemented in hardware (e.g., as a combination of flip-flops and combinatorial logic). In some embodiments, the state machine 572 may be hard-coded to implement a number of predefined states and state transitions. In some other embodiments, the plurality the personality controller 570 may configure the state machine 572 using state machine (SM) configuration data 554. For example, the personality controller 570 may retrieve the SM configuration data 554 from an SM data store 553 within the ROM 550.

In some embodiments, the SM configuration data 554 may specify all possible state transitions of the state machine 572. However, only a subset of the possible state transitions may be valid for a given embodiment of the security subsystem 500. For example, to save cost, the same security subsystem architecture may be implemented in various electronic systems for different uses and/or different end users. However, some electronic systems may require different security configurations than others. More specifically, certain states and/or state transitions that may be suitable for a particular instance of the security subsystem 500 may not be suitable for a different instance of the security subsystem 500.

In some embodiments, the personality controller 570 may retrieve SM trimming data 542 from the OTP memory 540 to "trim" the SM configuration data 554. For example, the SM trimming data 542 may be specific to the particular electronic system in which the security subsystem 500 is implemented. In some aspects, the SM trimming data 542 may specify one or more invalid state transitions between the various states of the state machine 572. The invalid transitions may override or otherwise eliminate one or more of the possible state transitions specified in the SM configuration data 554. Accordingly, the SM trimming data 542 may be used to customize the state machine 572 for different electronic systems and/or applications.

The personality controller 570 may determine an initial state of the state machine 572 based, at least in part, on the SM configuration data 554 and/or the SM trimming data 542. When the state machine 572 is initialized and/or transitions to the initial state, the personality controller 570 may retrieve a set of access filter (AF) configuration data 556 associated with the initial state. For example, the state machine 572 may retrieve the AF configuration data 556 from an AF data store 555 within ROM 550. The AF configuration data 556 may include a set of rules governing the hardware access restrictions under the current state of the state machine 572. The personality controller 570 may then proceed to filter transactions between the various hardware resources of the security subsystem 500 according to the rules defined by the AF configuration data 556.

In some embodiments, the personality controller 570 may filter hardware access transactions 516 initiated by the secure CPU 510 based on the AF configuration data 556 associated with the current state of the state machine 572. For example, the personality controller 570 may prevent the secure CPU 510 from accessing any data and/or instructions that may be tied to a different personality or state of the state machine 572. The personality controller 570 also may prevent the secure CPU 510 from communicating data and/or instructions, via the external bus 530, to any external devices that should not have access to such data or instructions during the current personality or state of the state machine 572.

In some embodiments, the personality controller 570 may filter mailbox communications 518 initiated by the secure CPU 510 based on the AF configuration data 556 associated with the current state of the state machine 572. For example, the personality controller 570 may prevent the secure CPU 510 from reading and/or writing to certain registers of a mailbox 574 residing within the personality controller 570. As described above with respect to FIG. 3, the mailbox 574 may facilitate secure communications between the secure CPU 510 and one or more external devices which communicate on the external bus 530. However, in some states (e.g., during secure boot), the secure CPU 510 should not have any communication with the external devices. Thus, in some aspects, the personality controller 570 may disable the mailbox 574 or otherwise reject the mailbox communications 518 depending on the current personality or state of the state machine 572.

In some embodiments, the personality controller 570 may filter hardware access transactions 524 initiated by the secure peripherals 520 based on the AF configuration data 556 associated with the current state of the state machine 572. For example, the personality controller 570 may prevent the secure peripherals 520 from accessing any data and/or instructions that such secure peripherals should not have access to during the current personality or state of the state machine 572. The personality controller 570 also may prevent the secure secure peripherals 520 from communicating data and/or instructions, via the external bus 530, to any external devices that should not have access to such data or instructions during the current personality or state of the state machine 572.

In some embodiments, the personality controller 570 may filter hardware access transactions 526 targeting the secure peripherals 520 based on the AF configuration data 556 associated with the current state of the state machine 572. For example, the personality controller 570 may generally prevent any external devices from communicating, via the external bus 530, with any of the secure peripherals 520. The personality controller 570 also may prevent the secure CPU 510 from communicating data and/or instructions to any secure peripherals 520 that should not have access to such data or instructions during the current personality or state of the state machine 572.

In some embodiments, the personality controller 570 may filter hardware access transactions 534 targeting one or more external devices based on the AF configuration data 556 associated with the current state of the state machine 572. For example, in some states (e.g., while providing runtime security services), the secure CPU 510 and/or secure peripherals 520 may be permitted to read data and/or instructions from external memory. However, in some other states (e.g., during secure boot), neither the secure CPU 510 nor the secure peripherals 520 may be permitted to communicate with any external devices.

In some embodiments, the personality controller 570 may filter mailbox communications 536 initiated by the external devices based on the AF configuration data 556 associated with the current state of the state machine 572. More specifically, the personality controller 570 may prevent any external devices from reading and/or writing to certain registers of the mailbox 574. For example, in some states (e.g., during secure boot), no external devices should be in communication with the security subsystem 500. Thus, in some aspects, the personality controller 570 may disable the mailbox 574 or otherwise reject the mailbox communications 536 depending on the current personality or state of the state machine 572.

In some embodiments, the personality controller 570 may filter hardware access transactions 552 targeting the ROM 550 based on the AF configuration data 556 associated with the current state of the state machine 572. For example, the personality controller 570 may generally prevent any attempts to access the ROM 550 by certain secure peripherals 520 (such as DMA engines, I/O interfaces, and the like) and/or external devices. When implementing a particular personality, the secure CPU 510 should be allowed to access only the firmware associated with that personality. Thus, the personality controller 570 may prevent the secure CPU 510 from accessing any memory address of a CPU code store 551, within ROM 550, other than the memory address(es) in which the firmware for the current personality is stored.

In some embodiments, the personality controller 570 may filter hardware access transactions 562 targeting the RAM 560 based on the AF configuration data 556 associated with the current state of the state machine. For example, the personality controller 570 may generally prevent any attempts to access the RAM 560 by external devices. In some states or personalities, the secure CPU 510 and/or secure peripherals 520 may be permitted to access only a subset of addresses in RAM 560. In other states or personalities, the secure CPU 510 and/or secure peripherals 520 may be prohibited from accessing the subset of addresses in RAM 560. In some embodiments, different types of memory access (e.g., read or write) may be restricted for different memory addresses depending on the current state or personality.

As described above with respect to FIG. 4, the personality controller 570 may filter the transactions 516, 524, 526, 534, 552, and 562 based, at least in part, on the transaction type 410, the target address 420, the initiator ID 430, and/or the security information 440 associated with each transaction 400. The AF configuration data 556 may define the combination of attributes or conditions to be permitted and/or rejected by the personality controller 570 when filtering incoming transactions. When rejecting a transaction, the personality controller 570 may trigger a transparent failure, security exception, system reset, or alarm. In some embodiments, when a transparent failure is triggered, the personality controller 570 may ignore any incoming write transactions and return a failure value in response to incoming read transactions. The failure value may be a zero value, a predefined value, a random value, or any value other than the actual value that would be returned for the read transaction.

When the secure CPU 510 has completed the tasks and/or instructions associated with the current state or personality, the secure CPU 510 may request a transition to a new state. For example, the secure CPU 510 may request the transition to the new state by outputting a state change (SC) request 514 to the personality controller 570. The personality controller 570 may validate the SC request 514 by determining whether a valid state transition exists (or by confirming that no invalid state transition is specified by the SM trimming data 542) between the current state of the state machine 572 and the new state.

Upon validating the SC request 514, the personality controller 570 may clear at least a portion of the data stored in RAM 560 using a memory clear (M_Clear) signal 564. For example, the personality controller 570 may clear the firmware stored in RAM 560 under the current state, as well as any associated data that may not be necessary for the new state. In some embodiments, the personality controller 570 may also clear communications stored in one or more registers of the mailbox 574 prior to transitioning to the new state. The personality controller 570 may further reset the secure CPU 510 and secure peripherals 520 using reset signals 512 and 522, respectively. For example, the personality controller 570 may reset the internal state of the processor 210 and/or secure peripherals 220 by clearing any internal registers and/or memory. In some embodiments, the reset signal 512 may further include a new reset vector for the secure processor 510.

After clearing the registers and resetting the hardware resources of the security subsystem, the personality controller 570 may then transition the state machine 572 to the new state. When transitioning to the new state, the personality controller 570 may retrieve a new set of access filter configuration data 556 and update the state ID signal 532 to reflect the new state or personality. Finally, the personality controller 570 may release the secure CPU 510 and secure peripherals 520 from the state of reset (e.g., using the reset signals 512 and 522, respectively). The secure processor 510 may then proceed to execute instructions associated with the new state or personality, for example, by accessing firmware stored at the memory location pointed to by the new reset vector (e.g., in the CPU code store 551).

FIG. 6A shows an example state machine 600A, in accordance with some embodiments. The state machine 600A may be one embodiment of the state machine 310 of FIG. 3 and/or state machine 572 of FIG. 5 prior to trimming. Thus, the state machine 600A depicts all possible state transitions T1-T3 between a number of states P1-P3.

In the embodiment of FIG. 6A, a first transition T1 may be possible from state P1 to state P2, a second transition T2 may be possible from state P2 to state P3, and a third transition T3 may be possible from state P1 to state P3. As described above, each of the states P1-P3 may be associated with a respective personality which defines a set of hardware access rules for the hardware resources of a security subsystem. For example, the first state P1 may define a set of rules for fetching or retrieving firmware from ROM or external memory (such as flash memory, USB drives, or other non-volatilte storage devices), the second state P2 may define a set of rules for verifying the firmware, and the third state P3 may define a set of rules for executing the firmware.

Figure 6B:
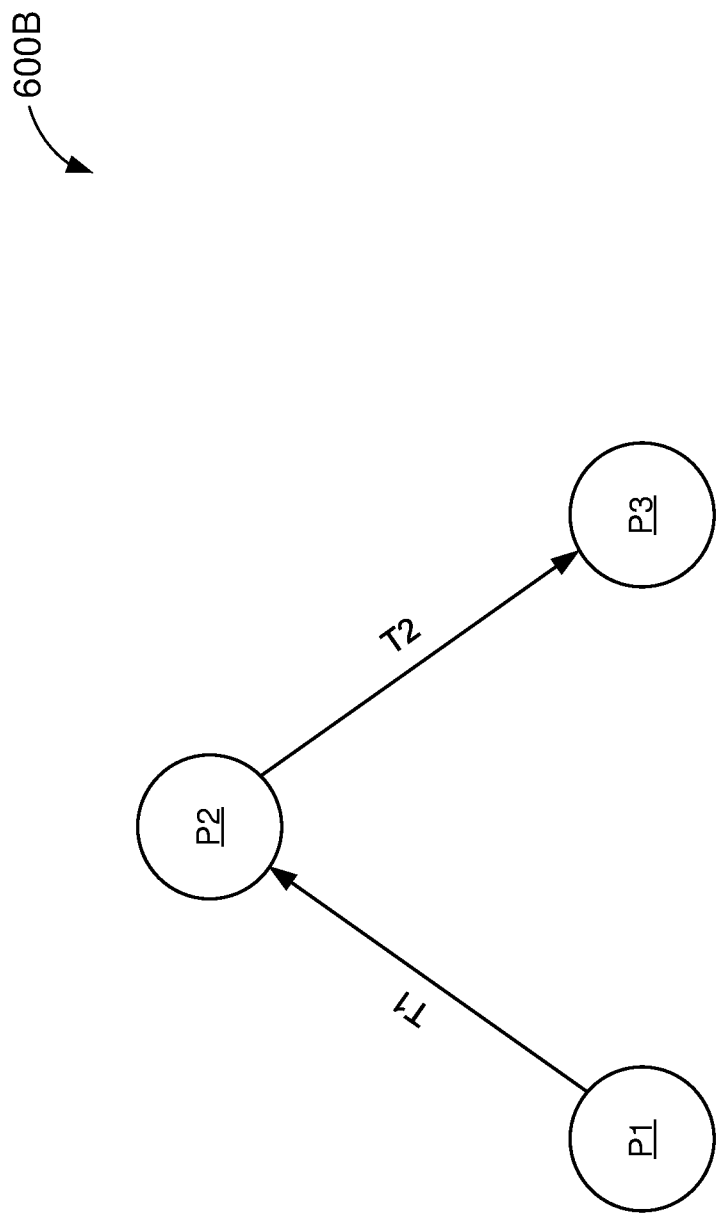
FIG. 6B shows an example state machine, in accordance with some other embodiments.

FIG. 6B shows an example state machine 600B, in accordance with some other embodiments. The state machine 600B may be one embodiment of the state machine 600A after trimming. Thus, the state machine 600B includes only a subset of the possible state transitions depicted in FIG. 6A.

In the embodiment of FIG. 6B, the first transition T1 is valid from state P1 to state P2 and the second transition T2 is valid from state P2 to state P3. However, with reference for example to FIG. 6A, the third transition T3 is not valid in the state machine 600B. Thus, the state machine 600B may not transition from the first state P1 to the third state P3 without going through the second state P2. For example, the state machine 600B may be used to implement a secure boot operation. More specifically, after fetching the firmware (e.g., in accordance with the rules defined for P1), the security subsystem implementing the state machine 600B must then verify the firmware (e.g., in accordance with the rules defined for P2) before it can execute the firmware (e.g., in accordance with the rules defined for P3).

As shown in FIG. 6B, the state transitions T1 and T2 allow for only unidirectional transitions between the states P1, P2, and P3. For example, once the state machine 600B has transitioned to the second state P2, it can no longer transition back to the first state P1 (e.g., without resetting the security subsystem). In other words, the personality controller may no longer permit the secure CPU (or any other hardware resources) to access the firmware stored in ROM after the state transition T1 has been completed. This provides an additional security for the firmware, as well as other sensitive data and/or instructions stored in the security subsystem.

Figure 6C:
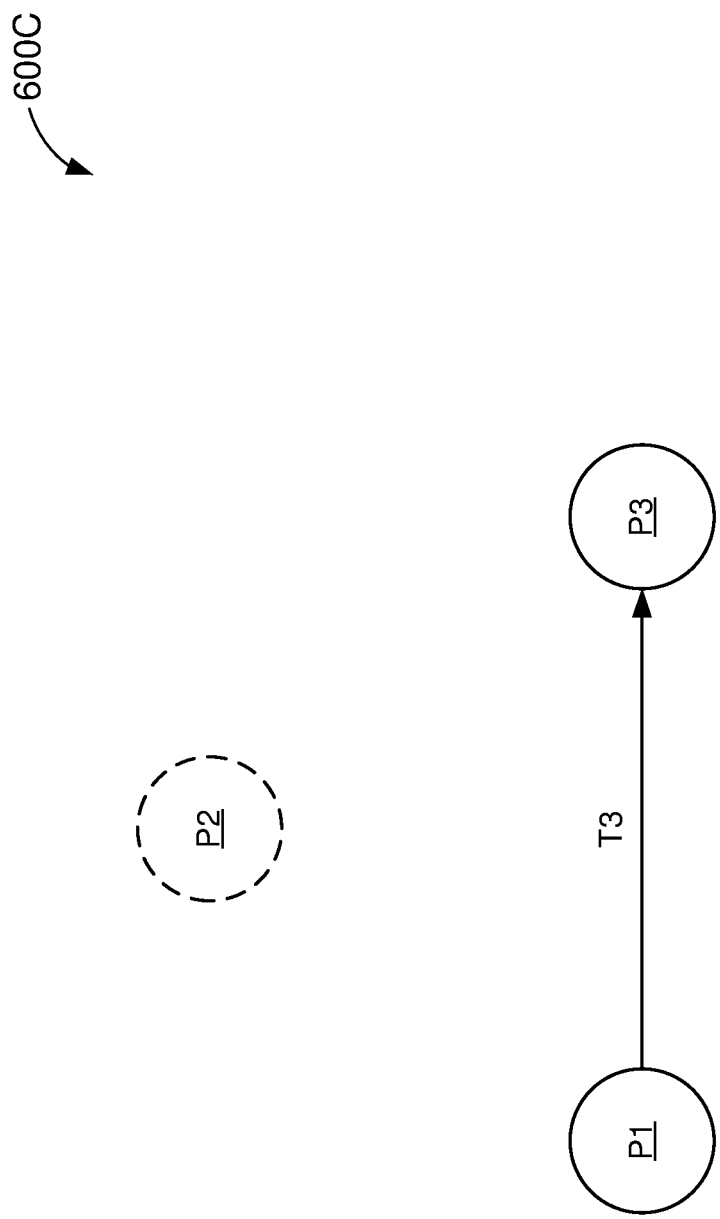
FIG. 6C shows an example state machine, in accordance with some other embodiments.

FIG. 6C shows an example state machine 600C, in accordance with some embodiments. The state machine 600C may be another embodiment of the state machine 600A after trimming. Thus, the state machine 600C includes only a subset of the possible state transitions depicted in FIG. 6A.

In the embodiment of FIG. 6C, only the third transition T3 is valid from state P1 to state P3. More specifically, with reference for example to FIG. 6A, neither the first transition T1 nor the second transition T2 is valid in the state machine 600C. Thus, the state machine 600C can only transition from the first state P1 to the third state P3. Because there are no valid transitions to or from the second state P2, the second state P2 is effectively eliminated in the state machine 600C. For example, the state machine 600C may be used to implement a non-secure boot operation. More specifically, after fetching the firmware (e.g., in accordance with the rules defined for P1), the security subsystem implementing the state machine 600C then directly proceeds to execute the firmware (e.g., in accordance with the rules defined for P3).

As shown in FIG. 6C, the state transition T3 allows for only a unidirectional transition between the states P1 and P3. For example, once the state machine 600C has transitioned to the third state P3, it can no longer transition back to the first state P1. The state machine 600C can return to the first state P1 only by resetting the security subsystem and clearing any firmware stored in RAM. In other words, the personality controller may no longer permit the secure CPU (or any other hardware resources) to access the firmware stored in ROM after the state transition T3 has been completed. This provides an additional security for the firmware, as well as other sensitive data and/or instructions stored in the security subsystem.

Figure 7:
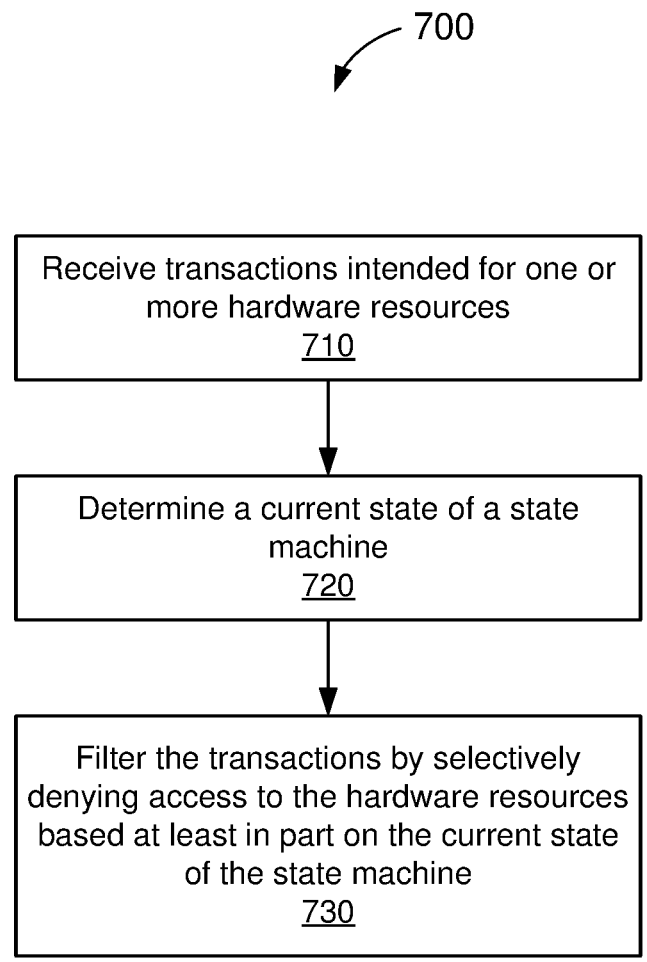
FIG. 7 is an illustrative flowchart depicting an example operation for filtering hardware access transactions by a processing system, in accordance with some embodiments.

FIG. 7 is an illustrative flowchart depicting an example operation 700 for filtering hardware access transactions by a processing system, in accordance with some embodiments. With reference for example to FIG. 5, the example operation 700 may be performed by the personality controller 570 to filter transactions between the hardware resources 510-560 of the security subsystem 500.

The personality controller may receive transactions intended for one or more hardware resources (710). In some embodiments, all hardware access transactions within the security subsystem may be routed through the personality controller. With reference for example to FIG. 4, each hardware access transaction may include a transaction type, a target address, an initiator ID, security information, and/or other information pertaining to hardware access.

The personality controller may further determine a current state of a state machine (720). In some embodiments, the state machine may be implemented in hardware (e.g., as a combination of flip-flops and combinatorial logic). Each state of the state machine may be associated with a respective one of a plurality of predefined personalities. More specifically, each personality may define a set of restrictions on hardware access and/or firmware execution.

The personality controller filters the transactions by selectively denying access to the hardware resources based at least in part on the current state of the state machine (730). In some embodiments, the personality controller may retrieve a set of access filter (AF) configuration data (e.g., from ROM) based, at least in part, on the current state of the state machine. In some other embodiments, the personality controller may retrieve the AF configuration data from external (e.g., flash) memory. When retrieved from external memory, the personality controller may use one or more secure peripherals (such as cryptographic accelerators) to decrypt and/or authenticate the AF configuration data. The AF configuration data may include a set of rules governing the hardware access restrictions under the current state. More specifically, the AF configuration data may specify how to filter each transaction based on the transaction type, target address, initiator ID, security information, or any combination thereof.

Figure 8:
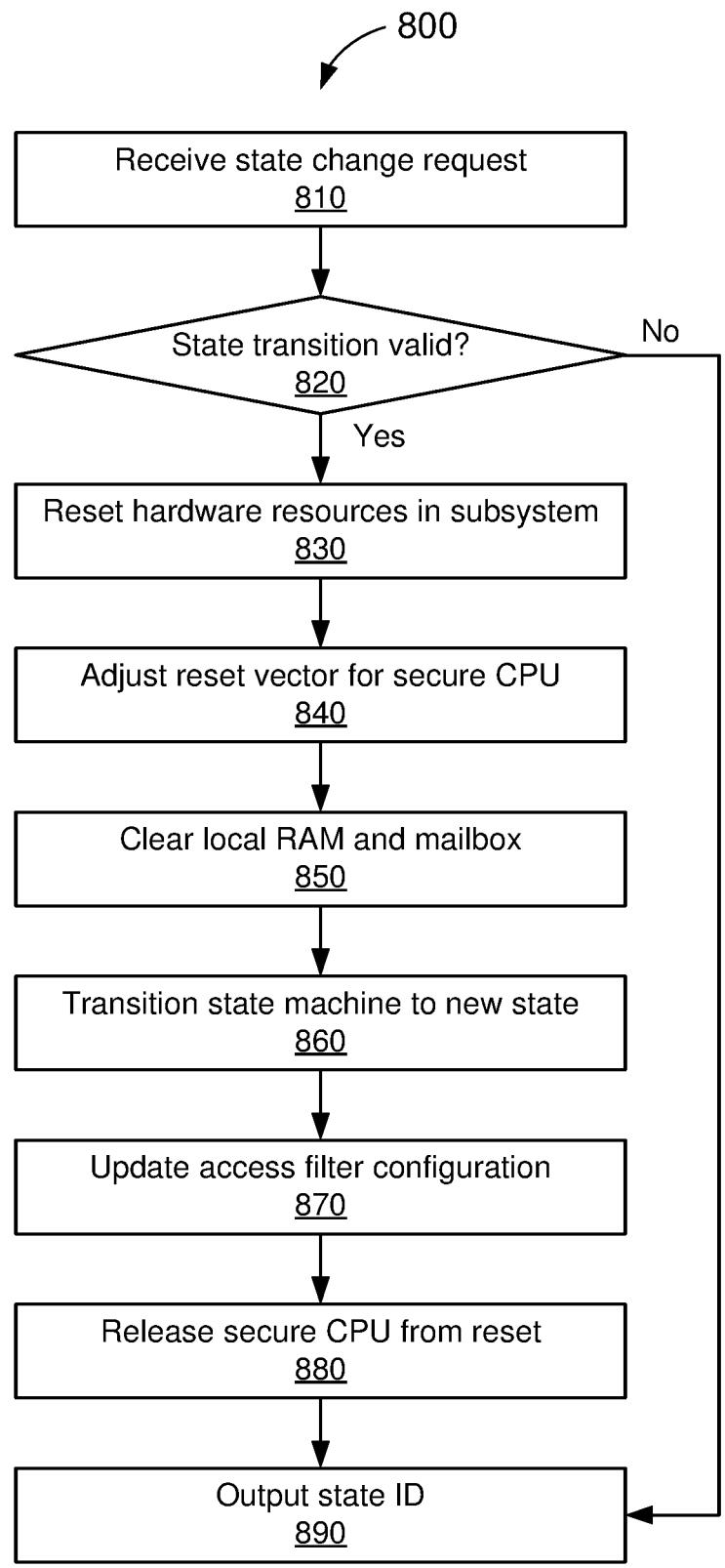
FIG. 8 is an illustrative flowchart depicting an example operation for changing the state of a personality controller, in accordance with some embodiments.

FIG. 8 is an illustrative flowchart depicting an example operation 800 for changing the state of a personality controller, in accordance with some embodiments. With reference for example to FIG. 5, the example operation 500 may be performed by the personality controller 570 to dynamically change the hardware access rules and/or restrictions for the security subsystem 500.

The personality controller receives a state change request (810) and determines whether a valid state transition exists from the current state of the state machine to the requested new state (820). For example, the secure CPU may request a change of state by the personality controller after the secure CPU has completed all tasks and/or instructions related to the current state. The personality controller may implement the state change only if the state machine includes a valid transition from the current state to the new state.

If no valid state transition exists from the current state to the next state (as tested at 820), the personality controller remains in the current state and continues to output the current state ID (890). With reference for example to FIG. 3, the state ID signal may be used to indicate the current state of the state machine to other components of the personality controller and/or other hardware resources of the electronic system.

If a valid transition state transition exists from the current state to the next state (as tested at 820), the personality controller may proceed by resetting the hardware resources of the security subsystem (830). For example, the personality controller may assert or activate a reset signal which is provided to each of the hardware resources (such as the secure CPU and secure peripherals) in the security subsystem. The reset signal may be used to reset the internal state of the hardware resources, for example, by clearing any internal registers and/or memory.

The personality controller may further adjust a reset vector for the secure CPU (840). For example, the personality controller may reprogram the secure CPU with a new, state-specific, reset vector while the secure CPU is in the reset state. The reset vector may point to a new memory address (e.g., in ROM) in which the firmware or instructions associated with the new personality is stored. Accordingly, any time the secure CPU is reset, while the state machine is in the new state, the secure CPU will not be able to re-load the firmware or instructions associated with the previous state.

The personality controller may also clear the local RAM and mailbox (850). For example, the personality controller may erase or overwrite data stored in the RAM using a memory clear signal. In some embodiments, the personality controller may clear only a particular range (or ranges) of memory addresses storing data and/or instructions that may not be necessary for the new personality. The personality controller may also clear one or more registers of the mailbox to erase any communications between the secure CPU and one or more external devices relating to the current personality.

The personality controller may then transition the state machine to the new state (860) and update the access filter configuration based on the new sate (870). For example, the personality controller may retrieve a new set of access filter (AF) configuration data that is specific to the new state. The AF configuration data may include a set of rules governing the hardware access restrictions under the new personality.

After the state machine has transitioned to the new state, the personality controller may release the hardware resources from reset (880) and output the new state ID (890). For example, the personality controller may de-assert the reset signal to release the secure CPU and secure peripherals from the reset state. This allows the secure CPU to begin executing instructions associated with the new personality, for example, by loading the firmware from the memory location pointed to by the new reset vector.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A processing system, comprising:
   a processor;
   a first memory storing instructions that are executable by the processor, wherein execution of the instructions causes the processor to initiate transactions with one or more hardware resources;
   a state machine configured to transition between a plurality of states each associated with respective configuration data; and
   an access filter configured to:
      receive the configuration data associated with a current state of the plurality of states of the state machine; and
      filter the transactions responsive to the current state of the state machine by selectively denying access to the hardware resources based at least in part on the received configuration data.

2. The processing system of claim 1, wherein each of the transactions includes a target address to be accessed by the processor, a type of operation to be performed on the target address, a current security state of the processor, or a combination thereof.

3. The processing system of claim 2, wherein the access filter is to filter the transactions by:
   determining, for each of the transactions, whether the processor is permitted to access the target address based on the configuration data; and
   rejecting any transactions for which the processor is not permitted to access the target address.

4. The processing system of claim 2, wherein the access filter is to filter each of the transactions by:
   determining, based on the configuration data, whether the processor is permitted to perform the type of operation on the target address; and
   rejecting the transaction if the type of operation is not permitted for the target address.

5. The processing system of claim 2, wherein the access filter is to filter the transactions by:
   determining, based on the configuration data, whether the processor is permitted to access the target address while operating in the current security state; and
   rejecting the transaction if access to the target address is not permitted under the current security state.

6. The processing system of claim 1, wherein the access filter is further configured to filter transactions initiated by one or more of the hardware resources based at least in part on the current state of the state machine.

7. The processing system of claim 1, wherein the state machine is further configured to:
   receive a state transition request from the processor;
   validate a transition from the current state to a new state indicated by the state transition request; and
   transition to the new state if the validation is successful.

8. The processing system of claim 7, wherein the transition to the new state further causes the state machine to:
   reset the processor;
   adjust a reset vector for the processor based on the new state; and
   enable the processor to resume executing instructions from an address in the first memory indicated by the reset vector.

9. The processing system of claim 7, wherein the transition to the new state further causes the state machine to erase data stored in a second memory.

10. The processing system of claim 9, wherein the second memory comprises a mailbox storing communications between the processor and one or more devices external to the processing system.

11. The processing system of claim 7, wherein the transition to the new state further causes the state machine to reset one or more of the hardware resources.

12. A method of filtering transactions by a processing system, comprising:
   receiving transactions intended for one or more hardware resources;
   determining a current state of a state machine configured to transition between a plurality of states each associated with respective configuration data;
   receive the configuration data associated with the current state of the state machine; and
   filtering the transactions responsive to the current state of the state machine by selectively denying access to the hardware resources based at least in part on the received configuration data.

13. The method of claim 12, wherein the filtering comprises:
   determining, for each of the transactions, at least one of a target address to be accessed, a type of operation to be performed on the target address, a current security state, or a combination thereof.

14. The method of claim 13, wherein the filtering further comprises:
   determining, for each of the transactions, whether access to the target address is permitted based on the configuration data; and
   rejecting any of the transactions for which access to the target address is not permitted.

15. The method of claim 13, wherein the filtering further comprises, for each of the transactions:
   determining, based on the configuration data, whether the type of operation is permitted for the target address; and
   rejecting the transaction if the type of operation is not permitted for the target address.

16. The method of claim 13, wherein the filtering further comprises, for each of the transactions:
   determining, based on the configuration data, whether the processer is permitted to access the target address while operating in the current security state; and
   rejecting the transaction if access to the target address is not permitted under the current security state.

17. A personality controller for a processing system, comprising:

a state machine configured to transition between a plurality of states each associated with respective configuration data; and an access filter configured to:
   receive transactions intended for one or more hardware resources;
   determine a current state of the state machine;
   receive the configuration data associated with the current state of the state machine; and
   filter the transactions responsive to the current state of the state machine by selectively denying access to the hardware resources based at least in part on the received configuration data.

18. The personality controller of claim 17, wherein the filtering of the transactions comprises:
   determining, for each of the transactions, at least one of a target address to be accessed, a type of operation to be performed on the target address, or a current security state; and
   selectively denying access to the intended hardware resource the target address, the type of operation, or the current security state.

19. The personality controller of claim 17, wherein the state machine is further configured to:
   receive a state transition request;
   validate a transition from the current state to a new state indicated by the state transition request; and
   transition to the new state if the validation is successful.

20. The personality controller of claim 19, wherein the transition to the new state further causes the state machine to:
   reset a processor;
   adjust a reset vector for the processor based on the new state; and
   enable the processor to resume executing instructions from an address in memory indicated by the reset vector.

\* \* \* \* \*